Patented Aug. 14, 1923.

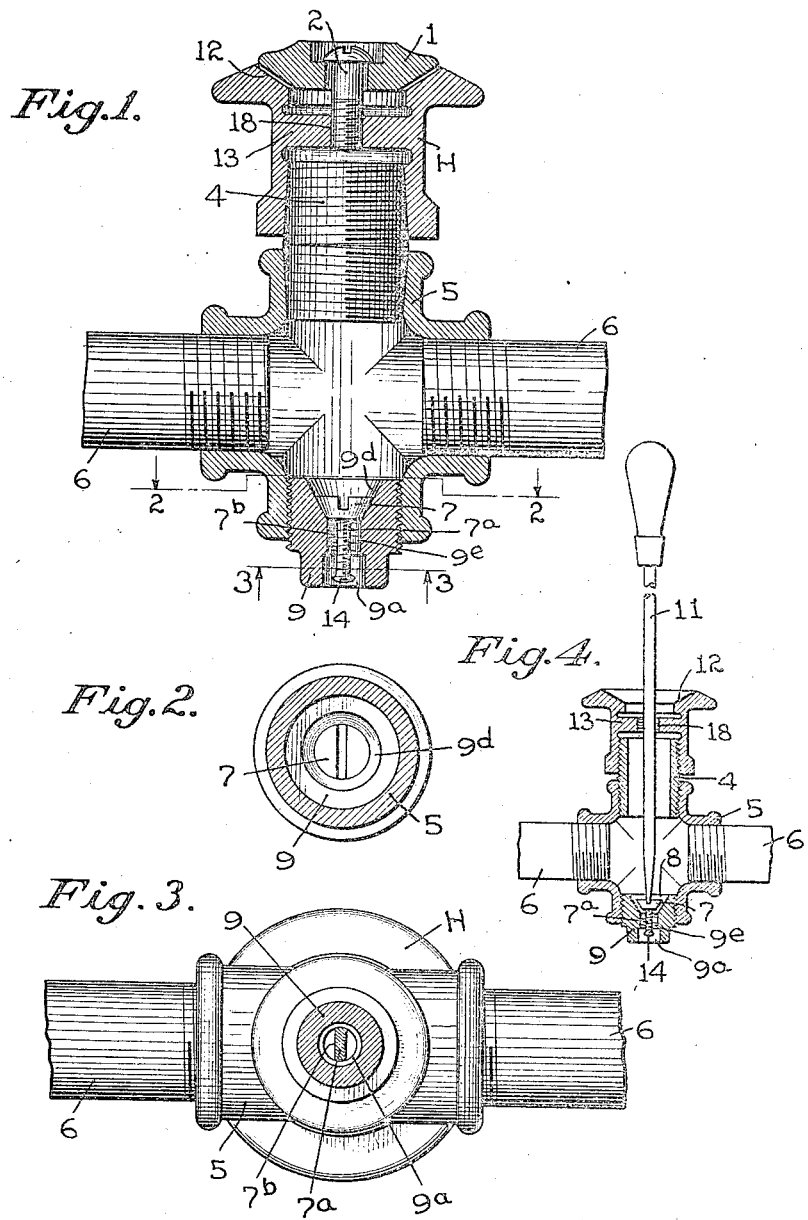

1,465,004

UNITED STATES PATENT OFFICE.

HOWARD B. SHERMAN AND DONALD M. BLISS, OF BATTLE CREEK, MICHIGAN, ASSIGNORS TO H. B. SHERMAN MANUFACTURING CO., OF BATTLE CREEK, MICHIGAN, A CORPORATION OF MICHIGAN.

SCREW-OPERABLE DRAIN VALVE.

Original application filed January 19, 1922, Serial No. 530,330. Divided and this application filed February 10, 1923. Serial No. 618,359.

*To all whom it may concern:*

Be it known that we, HOWARD B. SHERMAN and DONALD M. BLISS, citizens of the United States, residing at Battle Creek, in the county of Calhoun and State of Michigan, have invented certain new and useful Improvements in Screw-Operable Drain Valves; and we hereby declare that the following is a full, clear, and exact description thereof, reference being had to the accompanying drawings, which form part of this specification.

This invention is a novel improvement in drain valves especially adapted for use in sprinkler systems for lawns, gardens and the like where a number of sprinkler heads are located at different points in the surface to be sprinkled and are supplied with water from a common supply pipe, buried beneath such surface. The present application is a division of our application for sprinkler head (Case #6703) filed January 19, 1922, Serial #530,330.

The object of the invention is to provide a simple and effective means for draining the sprinkler heads and supply pipes to prevent damage by freezing.

The sprinkler heads are located at various points in the surface to be watered and connected with water supply pipes laid beneath the surface. Ordinarily the supply pipe must be so laid that it will drain to a common low point, and this requires great care in laying the supply pipes; and it is a further object of our present invention to enable the supply pipes to be laid immediately beneath the sod without any particular care as to inclination or level and yet enable same to be positively drained. By the use of our invention the supply pipes can be laid immediately beneath the sod and can follow the contour of the ground, and the sprinkler heads can be used at any desired place high or low; and preferably below each sprinkler head is installed one of our novel drain valves.

In the accompanying drawings we have illustrated one practical embodiment of the invention and will explain the same with reference thereto, and set forth in the claims the novel features of construction and novel combinations of parts for which protection is desired.

In said drawings:

Fig. 1 is a vertical sectional view of a sprinkler head such as shown in our aforesaid application, with connections thereof to a supply pipe, and showing our novel drain valve applied thereto.

Fig. 2 is a transverse section on the line 2—2 Fig. 1, looking down on the drain valve.

Fig. 3 is a transverse section on the line 3—3 Fig. 1, looking upwards.

Fig. 4 is a detail sectional view showing the drain valve opened.

In the practical utilization of the invention the water supply pipes are laid underground, to supply water to the sprinkler heads H which are connected therewith at any desired intervals.

The sprinkler head H may be of any suitable construction; but as shown preferably has a central passage with a conical seat 12 around its upper end, in which seat is a sprayer disk 1 secured in position by an axially disposed screw 2 passing through the disk and engaging a bridge member 13 in the head. This disk 1 is preferably provided on its under side with radial grooves forming water jet apertures, as explained in our aforesaid application.

The sprinkler heads are connected to the pipe 6 by pipe sections 4 which vary in length according to the depth of the pipe 6, or inequalities in the surface. Preferably each pipe section 4, to which is connected a sprinkler head, is connected to the upper end of a cross coupling 5, such as is commonly used in plumbing, which has four branches, the horizontal branches of this coupling being connected to sections of the water supply pipe 6 (which is made in sections extending from one coupling to another) in the usual manner as indicated in Fig. 1. The other branches of the cross coupling 5 are perpendicular, and into the upper branch is screwed the lower end of the pipe section 4, to the upper end of which the sprinkler head H is attached; and in the lower vertical branch of the coupling 5 we attach our novel drain valve.

The average lawn is of rolling or uneven character; and in freezing climates the water should be removed from the pipes to prevent freezing; therefore we provide our novel drain valve for the purpose of draining each coupling and pipe when the water is cut off.

As shown our novel drain valve comprises a tubular plug 9, which is externally threaded to engage the threads in the lower end of the coupling 5 and said plug has a central bore 9$^a$ and a conical seat 9$^d$ at the upper end of said bore, which is adapted to be closed by the conical valve head 7 attached to the upper end of a threaded stem 7$^a$ adapted to engage an internally threaded part 9$^c$ of the bore in plug 9, below the seat 9$^d$. Said stem 7$^a$ is preferably flattened on two sides, as shown at 7$^b$ in Figs. 1 and 3, so that when the valve 7 is slightly unseated as in Fig. 4, any water in the device can pass out through the bore 9$^a$ in the plug through the passages formed between the flattened sides of the stem 7$^a$ and the walls of the bore as shown in Figs. 3 and 4. The lower end of the stem 7$^a$ of valve 7 is preferably swaged or headed as at 14 to prevent its being completely unscrewed or removed from the plug.

By removing the spraying disk 1 and screw 2, the shank 11 of an ordinary screw driver may be inserted into the device through the threaded bore 18 of part 13, after the removal of the disk and screw, and the valve 7 can be turned to closed position (Fig. 1) or open position (Fig. 4) as desired. The opening 18 in bridge 13 and the conical seat 9$^d$ serve to direct the end of the screw driver 11 accurately into the slot in the drain valve 7 when it is desired to adjust the valve. This is an important practical feature especially if the pipe section 4 is long.

The sprinkler heads H are preferably placed in the ground so that their upper ends will be flush with the roots of the grass or with the surface of the garden or lawn to be sprinkled.

The drain valves should be closed before water is turned into the system but after the water has been shut off the valves 7 can be opened to drain out the system. It is not necessary with our drain valve to lay the pipe 6 on any particular grade, as each head H can be drained, as above described.

What we claim is:

1. A drain valve for the purpose specified comprising a body provided with a bore having a valve seat at its inner end and a threaded portion below the seat; and a valve member having a threaded shank engaging the threaded part of the bore, and a head adapted for engagement with a manually operable driver and to fit on said seat, substantially as described.

2. A drain valve as set forth in claim 1 having the threaded shank partly cut away lengthwise to permit flow of water past the shank when the valve is unseated, substantially as described.

3. In a drain valve as set forth in claim 1, said threaded shank being partly cut away lengthwise to permit the escape of water through the threaded part of the plug when the valve is unseated, and means to prevent disengagement of the valve member from the body when opening the valve.

4. In combination, a hollow body having an opening; a plug fitted in said opening provided with a bore having a valve seat in its inner end, and a threaded portion below the seat; and a valve member having a shank engaging the threaded part of the bore and a head adapted for engagement with a driver and to fit said seat, the valve being manually openable or closable by inserting a driver into the body and engaging said head.

5. A drain valve as set forth in claim 4, having the threaded shank partly cut away lengthwise to permit flow of water past the shank when the valve is unseated, substantially as described.

6. In a drain valve as set forth in claim 4, said threaded shank being partly cut away lengthwise to permit the escape of water through the threaded part of the plug when the valve is unseated, and swaged to prevent disengagement of the valve member from the body when opening the valve.

7. In combination with a hollow body having a threaded opening, a screw threaded plug fitted in said opening and provided with a bore having a valve seat in its inner end; and a threaded portion below the seat; a valve member having a flattened shank engaging the threaded part of the bore, and a head adapted to fit on said valve seat to close the bore, said head having a notch for engagement by a screw driver, the valve being manually openable or closable by inserting a driver into the body and engaging the slot in said head.

In testimony that we claim the foregoing as our own, we affix our signatures.

HOWARD B. SHERMAN.
DONALD M. BLISS.